United States Patent
Wu

(10) Patent No.: US 10,736,161 B2
(45) Date of Patent: Aug. 4, 2020

(54) DEVICE AND METHOD FOR HANDLING MEASUREMENT CONFIGURATION AND SIGNALING RADIO BEARER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 29 days.

(21) Appl. No.: 15/993,607

(22) Filed: May 31, 2018

(65) Prior Publication Data

US 2018/0352600 A1    Dec. 6, 2018

Related U.S. Application Data

(60) Provisional application No. 62/513,422, filed on May 31, 2017.

(51) Int. Cl.
| | |
|---|---|
| *H04W 4/00* | (2018.01) |
| *H04W 76/15* | (2018.01) |
| *H04W 76/34* | (2018.01) |
| *H04W 24/10* | (2009.01) |

(52) U.S. Cl.
CPC .......... *H04W 76/15* (2018.02); *H04W 24/10* (2013.01); *H04W 76/34* (2018.02)

(58) Field of Classification Search
CPC . H04W 72/0426; H04W 8/24; H04W 74/002; H04W 76/025; H04W 88/10; H04W 36/08; H04W 72/0406; H04W 48/20; H04W 36/04; H04W 72/0413;
(Continued)

(56) References Cited

U.S. PATENT DOCUMENTS

| | | | |
|---|---|---|---|
| 9,451,609 B2 * | 9/2016 | Fukuta | H04W 72/0426 |
| 10,334,655 B2 * | 6/2019 | Qin | H04W 24/02 |
| 10,356,679 B2 * | 7/2019 | Horn | H04W 36/18 |

FOREIGN PATENT DOCUMENTS

| | | |
|---|---|---|
| EP | 2373080 A1 | 10/2011 |
| EP | 2375804 A1 | 10/2011 |
| EP | 2945423 A1 | 11/2015 |

(Continued)

OTHER PUBLICATIONS

Search Report dated Oct. 31, 2018 for EP Application No. 18175174.4, pp. 1-4.

(Continued)

*Primary Examiner* — Hanh N Nguyen
(74) *Attorney, Agent, or Firm* — Winston Hsu

(57) ABSTRACT

A communication device for handling a measurement configuration in a SRB comprises at least one storage device for storing instructions and at least one processing circuit coupled to the at least one storage device. The at least one processing circuit is configured to execute the instructions stored in the at least one storage device. The instructions comprise establishing a first SRB; receiving a first measurement configuration from the first BS; transmitting a first measurement report to the first BS; receiving a first RRC message from the first BS; establishing a second SRB; receiving a second measurement configuration from the second BS; transmitting a second measurement report to the second BS; receiving a second RRC message from the first BS; and releasing the second measurement configuration and the second SRB, in response to the second RRC message.

12 Claims, 4 Drawing Sheets

(58) Field of Classification Search
CPC . H04W 36/28; H04W 76/046; H04W 76/048; H04W 36/30
See application file for complete search history.

(56) References Cited

FOREIGN PATENT DOCUMENTS

| | | |
|---|---|---|
| EP | 3041310 A1 | 7/2016 |
| EP | 3128785 A2 | 2/2017 |
| EP | 3128785 A3 | 2/2017 |

OTHER PUBLICATIONS

3GPP TS 37.340 V0.1.0 (May 2017) Technical Specification 3rd Generation Partnership Project; Technical Specification Group Radio Access Network; Evolved Universal Terrestrial Radio Access (E-UTRA) and NR; Multi-connectivity; Stage 2 (Release 15).

* cited by examiner

DEVICE AND METHOD FOR HANDLING MEASUREMENT CONFIGURATION AND SIGNALING RADIO BEARER

CROSS REFERENCE TO RELATED APPLICATIONS

This application claims the benefit of U.S. Provisional Applications No. 62/513,422 filed on May 31, 2017, which is incorporated herein by reference.

BACKGROUND OF THE INVENTION

1. Field of the Invention

The present invention relates to a device and a method used in a wireless communication system, and more particularly, to a device and a method of handling a measurement configuration and a signaling radio bearer (SRB) in a wireless communication system.

2. Description of the Prior Art

In a dual connectivity, a communication device simultaneously connects to two base stations (BSs) of which one is in a master node (MN) and the other is in a secondary node (SN). When the communication device is disconnected from the SN by the network, how to handle the problem associated to the measurement configuration and the SRB of the SN is known.

SUMMARY OF THE INVENTION

The present invention therefore provides a communication device for handling a measurement configuration and a SRB to solve the abovementioned problem.

A communication device for handling a measurement configuration in a SRB comprises at least one storage device for storing instructions and at least one processing circuit coupled to the at least one storage device. The at least one processing circuit is configured to execute the instructions stored in the at least one storage device. The instructions comprise establishing a first SRB for communicating with a first BS; receiving a first measurement configuration on the first SRB, from the first BS; transmitting a first measurement report associated to the first measurement configuration on the first SRB, to the first BS; receiving a first radio resource control (RRC) message on the first SRB from the first BS, wherein the first RRC message configures a second BS as a SN such that the communication device is in a dual connectivity with the first BS and the second BS; establishing a second SRB for communicating with the second BS, while the communication device is in the dual connectivity; receiving a second measurement configuration on the second SRB, from the second BS, while the communication device is in the dual connectivity; transmitting a second measurement report associated to the second measurement configuration on the second SRB, to the second BS, while the communication device is in the dual connectivity; receiving a second RRC message on the first SRB, from the first BS, while the communication device is in the dual connectivity, wherein the second RRC message configures the communication device to disconnect from the second BS; and releasing the second measurement configuration and the second SRB, in response to the second RRC message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
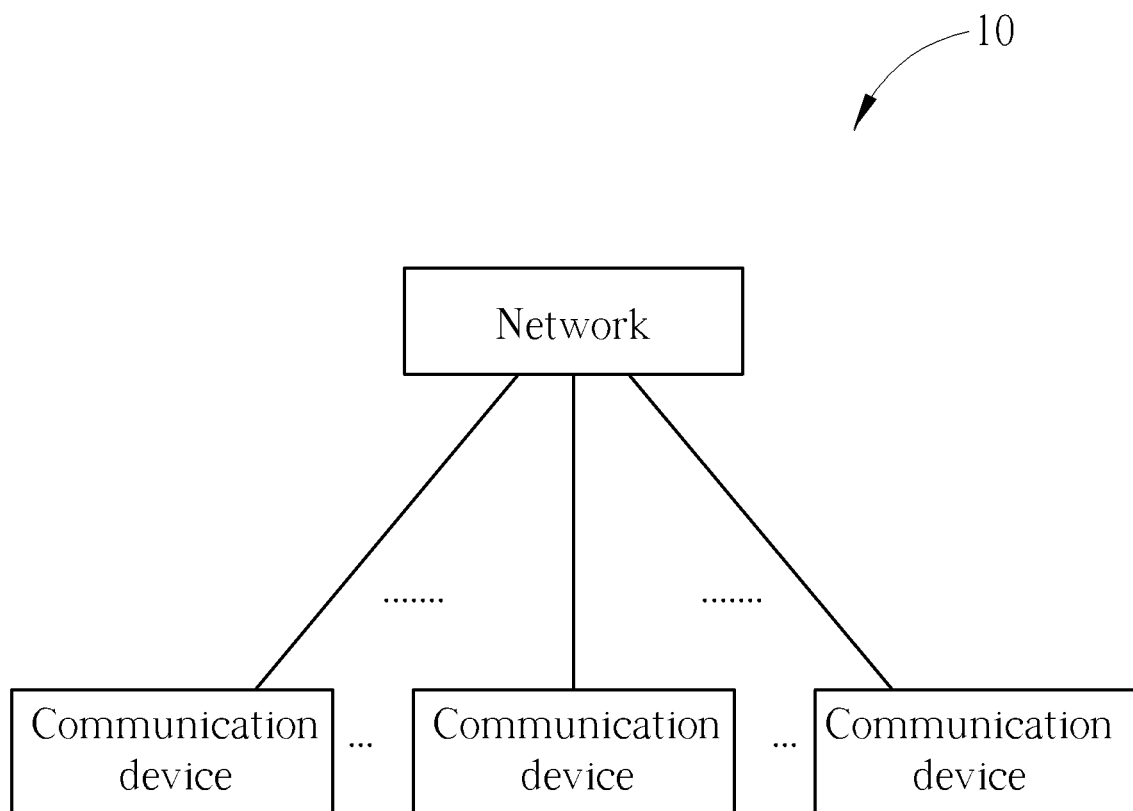
FIG. 1 is a schematic diagram of a wireless communication system according to an example of the present invention.

In FIG. 1, a network and communication devices are simply utilized for illustrating the structure of a wireless communication system 10. Practically, the network comprises at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and transmission time interval (TTI) shorter than 1 ms (e.g., 1, 2, 3 or 4 OFDM symbols, 100, or 200 us) for communicating between the communication devices and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
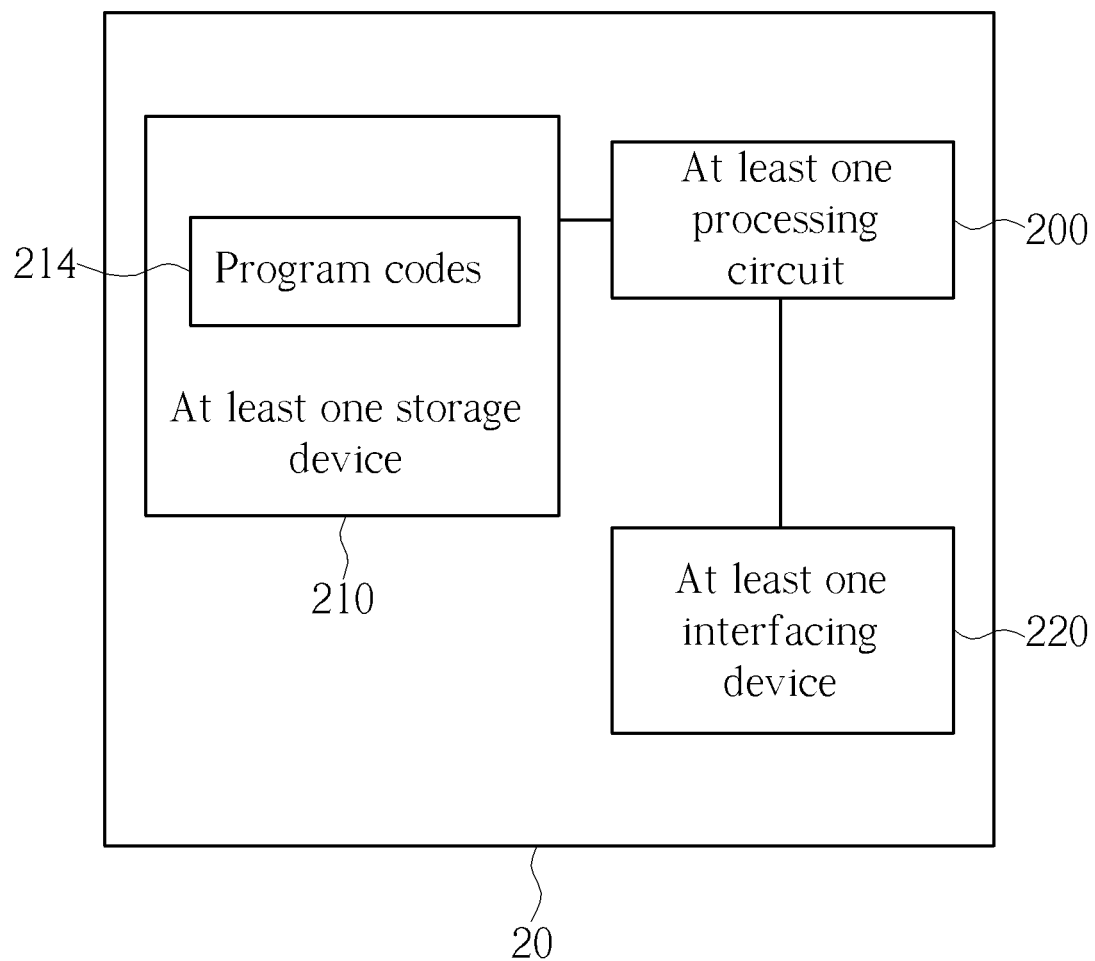
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver used to transmit and receive signals (e.g., data, messages and/or packets) according to processing results of the at least one processing circuit 200.

In the following embodiments, a UE is used for representing a communication device in FIG. 1, to simplify the illustration of the examples.

A UE connects to a master node (MN) and has a first signaling radio bearer (SRB). The MN transmits a first measurement configuration on the first SRB to the UE. In details, the UE transmits a first measurement report on the first SRB to the MN in response to the measurement configuration. The MN initiates a secondary node (SN) Addition procedure with a SN for the UE in response to the measurement report. The MN configures the UE to connect to the SN in response to the SN Addition procedure by transmitting a radio resource control (RRC) message (e.g. RRCConnectionReconfiguration message) on the first SRB to the UE. The RRC message includes a SN configuration for the UE to connect to the SN. In response to the RRC message, the UE establishes a second SRB. The SN transmits a second measurement configuration on the second SRB to the UE while the UE is in a dual connectivity (DC) with the MN and the SN. The UE transmits a second measurement report to the SN on the second SRB in response to the second measurement configuration.

Figure 3:
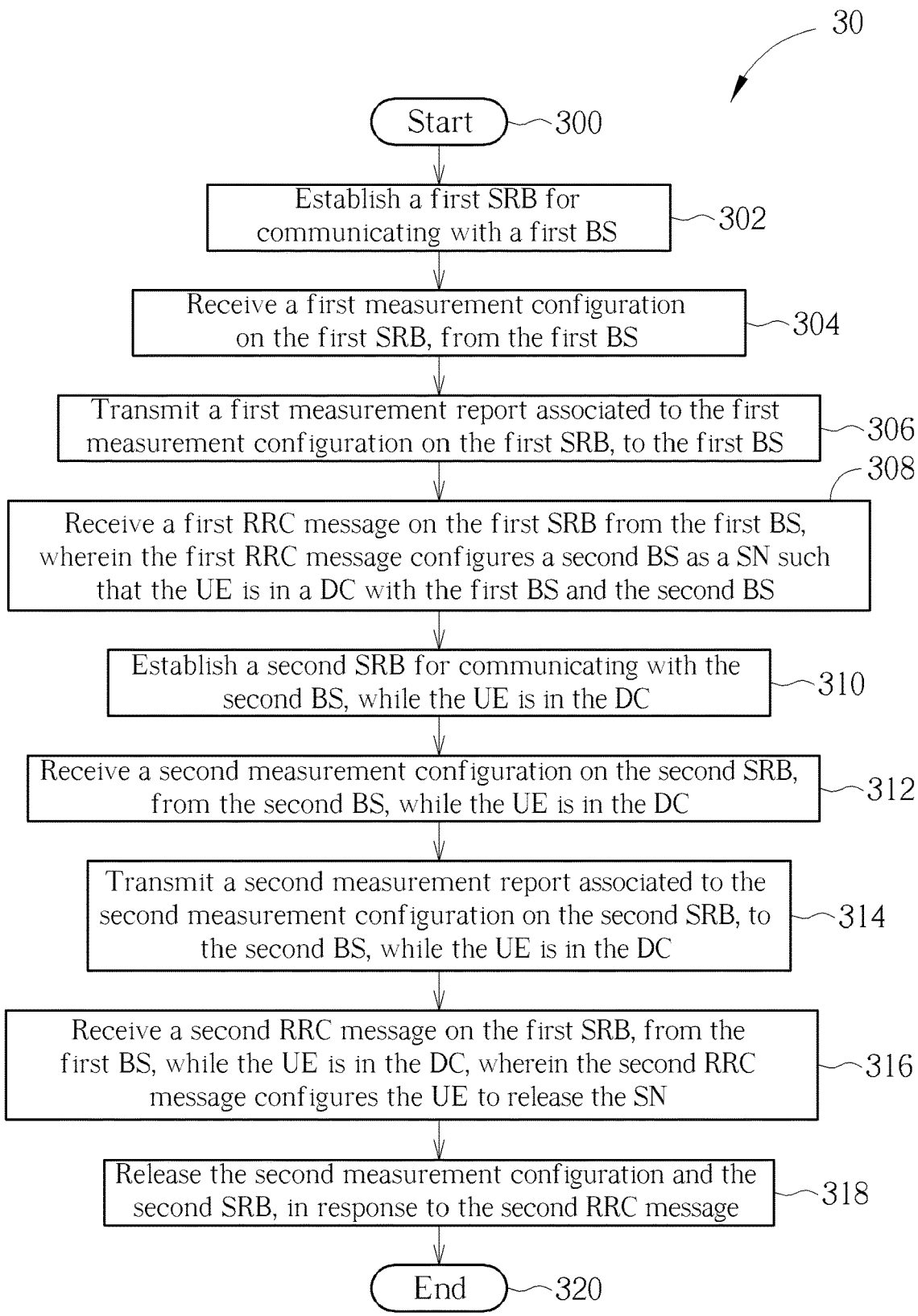
FIG. 3 is a flowchart of a process according to an example of the present invention.

A process 30 in FIG. 3 is utilized in a UE for handling a measurement configuration and a SRB, and includes the following steps:

Step 300: Start.

Step 302: Establish a first SRB for communicating with a first BS.

Step 304: Receive a first measurement configuration on the first SRB, from the first BS.

Step 306: Transmit a first measurement report associated to the first measurement configuration on the first SRB, to the first BS.

Step 308: Receive a first RRC message on the first SRB from the first BS, wherein the first RRC message configures a second BS as a SN such that the UE is in a DC with the first BS and the second BS.

Step 310: Establish a second SRB for communicating with the second BS, while the UE is in the DC.

Step 312: Receive a second measurement configuration on the second SRB, from the second BS, while the UE is in the DC.

Step 314: Transmit a second measurement report associated to the second measurement configuration on the second SRB, to the second BS, while the UE is in the DC.

Step 316: Receive a second RRC message on the first SRB, from the first BS, while the UE is in the DC, wherein the second RRC message configures the UE to release the SN.

Step 318: Release the second measurement configuration and the second SRB, in response to the second RRC message.

Step 320: End.

The following examples may be applied to the process 30.

In one example, the UE does not transmit a measurement report to the first BS according to the second measurement configuration, since the second measurement configuration is released (i.e., no longer valid).

In one example, the UE disconnects from the second BS to release the SN.

In one example, when the UE is configured the second SRB, the UE initializes (or reinitializes) at least one variable (to an initial value, e.g., 0), at least one timer or at least one counter of packet data convergence protocol (PDCP)/radio link control (RLC) entities of the second SRB. In one example, one of the at least one variable indicates a sequence number of a PDCP/RLC Service Data Unit (SDU) or a PDCP/RLC Protocol Data Unit (PDU) to be transmitted. One of the at least one variable indicates a sequence number of a PDCP/RLC SDU or a PDCP/RLC PDU to be received.

In one example, the UE keeps a DRB configuration, in response to the second RRC message. The DRB configuration configures a SCG to be part of a DRB which is a MCG split bearer, a SCG bearer or a SCG split bearer. The UE receives the DRB configuration before receiving the second RRC message. In one example, the first RRC message includes the DRB configuration. In one example, unless the second RRC message explicitly indicates to release the DRB configuration, the UE keeps the DRB configuration, in response to the second RRC message. In one example, the second RRC message reconfigures the DRB a MCG bearer. In one example, the second RRC message reconfigures the DRB to be a MCG split bearer from the SCG bearer or the SCG split bearer. In this case, a SCG part of the MCG split bearer is null (i.e., not configured) and the MCG split bearer behaves like a MCG bearer.

In one example, the UE keeps the first measurement configuration, in response to the second RRC message. That is, the UE in the DC determines to keep a measurement configuration depending on the measurement configuration configured by the first BS or the second BS.

In one example, the UE keeps or releases the second measurement configuration, in response to a first failure on a first connection with the first BS. In one example, the UE keeps or releases the second measurement configuration, in response to a second failure on a second connection with the second BS. In one example, the UE keeps the first measurement configuration, in response to the first failure on the connection with the first BS. In one example, the UE keeps the first measurement configuration, in response to the second failure on the second connection with the second BS.

In one example, the first RRC message comprises a SCG configuration generated by the second BS. The UE may release the SCG configuration in response to releasing the SN. The SCG configuration configures how the UE communicates with the second BS. The SCG configuration includes at least one of a physical cell identity, a carrier information, a temporary identifier (e.g., Cell Radio Network Temporary Identifier (C-RNTI)) assigned to the UE, a physical layer configuration (e.g., for physical channel(s), transmission mode, reference signal, channel state information reporting, etc.), a medium access control (MAC) configuration and at least one RB configuration. The at least one RB configuration includes a SRB configuration or the DRB configuration. Each of the at least one RB configuration includes at least one of a RB identity and a RLC configuration. The SRB configuration configures the second SRB to the UE. The DRB configuration configures a SCG part of a DRB (e.g., MCG split bearer), a DRB of a SCG bearer or a DRB of a SCG split bearer. The RB configuration includes or does not include a Packet Data Convergence Protocol (PDCP) configuration. In one example, the UE releases the second SRB (e.g., the SRB configuration), in response to the second RRC message. In one example, the first RRC message includes the DRB configuration instead of the SCG configuration.

In one example, the first SRB is a MCG bearer or a MCG split bearer. The second SRB is a SCG bearer or a SCG split bearer. In one example, the first SRB is a SRB 1 which is the MCG bearer or the MCG split bearer. The second SRB is a SRB 3 which is the SCG bearer or the SCG split bearer.

Figure 4:
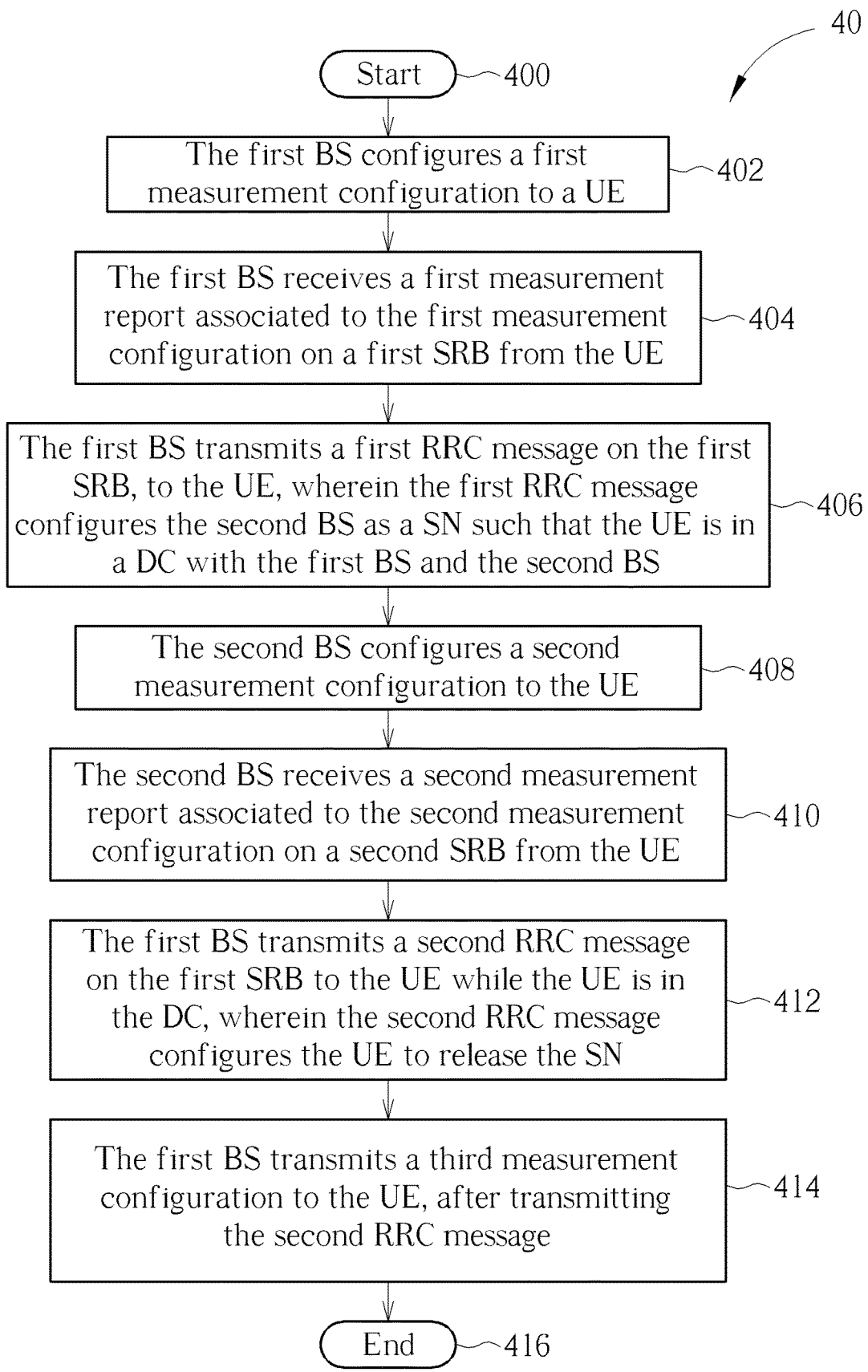
FIG. 4 is a flowchart of a process according to an example of the present invention.

A process 40 in FIG. 4 is utilized in a network comprising a first BS and a second BS, for handling a measurement configuration and a SRB, and includes the following steps:

Step 400: Start.

Step 402: The first BS configures a first measurement configuration to a UE.

Step 404: The first BS receives a first measurement report associated to the first measurement configuration on a first SRB from the UE.

Step 406: The first BS transmits a first RRC message on the first SRB, to the UE, wherein the first RRC message configures the second BS as a SN such that the UE is in a DC with the first BS and the second BS.

Step 408: The second BS configures a second measurement configuration to the UE.

Step 410: The second BS receives a second measurement report associated to the second measurement configuration on a second SRB from the UE.

Step 412: The first BS transmits a second RRC message on the first SRB to the UE while the UE is in the DC, wherein the second RRC message configures the UE to release the SN.

Step 414: The first BS transmits a third measurement configuration to the UE, after transmitting the second RRC message.

Step 416: End.

In one example, the first BS transmits the third measurement configuration to the UE, in response to transmission of the second RRC message, or releasing the SN.

Examples described for the process 30 may be applied to the process 40. The following examples may be applied to the processes above.

In one example, the first measurement configuration configures the UE to measure a first carrier. The second measurement configuration configures the UE to measure a second carrier different from the first carrier. In one example, the first measurement configuration includes or indicates a first Absolute Radio Frequency Channel Number (ARFCN) identifying the first carrier. The second measurement configuration includes or indicates a second ARFCN identifying the second carrier. The first and second carriers may be same or different. The first and second ARFCNs may be same or different. In one example, the third measurement configuration configures the second carrier and includes the second ARFCN. The UE measures the second carrier and transmits a third measurement report to the first BS, according to the third measurement configuration. The first BS receives the third measurement report associated to the third measurement configuration and configures a third BS as the SN to the UE according to/in response to the third measurement report.

In one example, the measurement configurations mentioned above configure a reporting configuration specifying a reporting criterion (e.g., a periodic reporting or an event). The UE may transmit a measurement report to the first BS or the second BS according to the reporting configuration.

In one example, the first RRC message (e.g., RRCConnectionReconfiguration) is generated by the first BS or the second BS. The UE transmits the first RRC response message on the first SRB to the first BS or to the second BS via the first BS on the first SRB, in response to the first RRC message. In one example, the second BS generates the first RRC message, and transmits the first RRC message to the first BS. The first BS encapsulates the first RRC message in a RRC message (e.g., a RRCConnectionReconfiguration message, a SCGReconfiguration message, a SCGReconfiguration message or a SCGReconfigurationCommand message), and transmits the RRC message to the UE on the first SRB. The UE transmits a RRC response message (e.g., a RRCConnectionReconfigurationComplete message, a SCGReconfigurationComplete message, a SCGReconfigurationComplete message or a SCGReconfigurationCommandComplete message) on the first SRB to the first BS, in response to the RRC message. The RRC response message includes or does not include the first RRC response message.

In case that the first RRC response is included in the RRC response message, the first BS transmits the first RRC response to the second BS.

In one example, the second RRC message (e.g., RRCConnectionReconfiguration) is generated by the first BS. In one example, the second RRC message does not include a SRB release configuration releasing the second SRB. The UE transmits a second RRC response message (e.g., a RRCConnectionReconfigurationComplete message) to the first BS in response to the second RRC message.

In one example, the second measurement configuration is generated by the second BS. In one example, the second measurement configuration is included in the first RRC message. In one example, the second measurement configuration is included in a third RRC message (e.g., a RRCConnectionReconfiguration message) generated by the second BS and is transmitted by the second BS on the second SRB to the UE, while the UE is in the DC with the first BS and the second BS. In response to the third RRC message, the UE transmits a third RRC response message (e.g., a RRCConnectionReconfigurationComplete message) on the second SRB to the second BS.

In one example, the first measurement configuration is generated by the first BS. The first measurement configuration is included in a fourth RRC message (e.g., a RRCConnectionReconfiguration message) which is generated and transmitted to the UE by the first BS on the first SRB. The UE transmits the fourth RRC response message (e.g., a RRCConnectionReconfigurationComplete message) on the first SRB to the first BS in response to the fourth RRC message. In one example, the first measurement configuration is received by the first BS and the UE from a third BS. The first BS implicitly configures the first measurement configuration to the UE by making the UE keep using the first measurement configuration in a handover command.

In one example, the first BS is an eNB, and the second BS is a gNB. In one example, the first BS is a gNB, and the second BS is an eNB. In one example, the first BS and the second BS are gNBs.

In the descriptions above, "carrier" may be replaced by "frequency" or "carrier frequency".

In one example, the UE establishes the first SRB, in response to a RRC connection establishment procedure. In one example, the UE performs the RRC connection establishment procedure by transmitting a RRCConnectionRequest message to a BS (e.g., the first BS, the third BS or a fourth BS). The BS transmits a RRCConnectionSetup message configuring the first SRB to the UE, in response to the RRCConnectionRequest message.

In one example, the UE establishes the second SRB, in response to the first RRC message. That is, the first RRC message configures the second SRB.

It should be noted that although the above examples are illustrated to clarify the related operations of corresponding processes, the examples can be combined or modified arbitrarily according to system requirements or design considerations. For example, the measurement object identity may be replaced by the reporting configuration identity in the processes above.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling measurement configuration and SRB. The UE releases the second measurement configuration and the second SRB, and keeps the DRB configuration, when releasing a SN. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling measurement configuration and signaling radio bearer (SRB), comprising:
    at least one storage device; and
    at least one processing circuit, coupled to the at least one storage device, wherein the at least one storage device stores instructions, the at least one processing circuit is configured to execute the instructions, and the instructions comprise:
    establishing a first SRB for communicating with a first base station (BS);
    receiving a first measurement configuration on the first SRB, from the first BS;
    transmitting a first measurement report associated to the first measurement configuration on the first SRB, to the first BS;
    receiving a first radio resource control (RRC) message on the first SRB from the first BS, wherein the first RRC message configures a second BS as a secondary node (SN) such that the communication device is in a dual connectivity with the first BS and the second BS;
    establishing a second SRB for communicating with the second BS, while the communication device is in the dual connectivity;
    receiving a second measurement configuration on the second SRB, from the second BS, while the communication device is in the dual connectivity;
    transmitting a second measurement report associated to the second measurement configuration on the second SRB, to the second BS, while the communication device is in the dual connectivity;
    receiving a second RRC message on the first SRB, from the first BS, while the communication device is in the dual connectivity, wherein the second RRC message configures the communication device to release the SN
    releasing the second measurement configuration and the second SRB, in response to the second RRC message; and
    keeping a data radio bearer (DRB) configuration, in response to the second RRC message, unless the second RRC message explicitly indicates to release the DRB configuration.

2. The communication device of claim 1, wherein the instructions further comprise:
    keeping the first measurement configuration, in response to the second RRC message.

3. The communication device of claim 1, wherein the instructions further comprise:
    releasing the second measurement configuration, in response to a second failure on the second SRB with the second BS.

4. The communication device of claim 1, wherein the instructions further comprise:
    keeping the first measurement configuration, in response to a second failure on the second SRB with the second BS.

5. The communication device of claim 1, wherein the instructions further comprise:
    releasing a secondary cell group (SCG) configuration in response to releasing the SN, wherein the first RRC message comprises the SCG configuration generated by the second BS.

6. A network comprising a first base station (BS) and a second BS for handling measurement configuration and signaling radio bearer (SRB), comprising:
    at least one storage device; and
    at least one processing circuit, coupled to the at least one storage device, wherein the at least one storage device stores instructions, the at least one processing circuit is configured to execute the instructions, and the instructions comprise:
    the first BS configuring a first measurement configuration to a communication device;
    the first BS receiving a first measurement report associated to the first measurement configuration on a first SRB from the communication device;
    the first BS transmitting a first radio resource control (RRC) message on the first SRB, to the communication device, wherein the first RRC message configures the second BS as a secondary node (SN) such that the communication device is in a dual connectivity with the first BS and the second BS;
    the second BS configuring a second measurement configuration to the communication device;
    the second BS receiving a second measurement report associated to the second measurement configuration on a second SRB from the communication device;
    the first BS transmitting a second RRC message on the first SRB to the communication device while the communication device is in the dual connectivity, wherein the second RRC message configures the communication device to release the SN
    the first BS transmitting a third measurement configuration to the communication device, after transmitting the second RRC message;
    the first BS receiving a third measurement report associated to the third measurement configuration; and
    the first BS configuring a third BS as the SN to the communication device in response to the third measurement report.

7. The network of claim 6, wherein the first RRC message comprises a secondary cell group (SCG) configuration generated by the second BS.

8. A network comprising a first base station (BS) and a second BS for handling measurement configuration and signaling radio bearer (SRB), comprising:
    at least one storage device; and
    at least one processing circuit, coupled to the at least one storage device, wherein the at least one storage device stores instructions, the at least one processing circuit is configured to execute the instructions, and the instructions comprise:
    the first BS configuring a first measurement configuration to a communication device;

the first BS receiving a first measurement report associated to the first measurement configuration on a first SRB from the communication device;

the first BS transmitting a first radio resource control (RRC) message on the first SRB, to the communication device, wherein the first RRC message configures the second BS as a secondary node (SN) such that the communication device is in a dual connectivity with the first BS and the second BS;

the second BS configuring a second measurement configuration to the communication device, wherein the second measurement configuration configures a carrier and includes a Absolute Radio Frequency Channel Number (ARFCN);

the second BS receiving a second measurement report associated to the second measurement configuration on a second SRB from the communication device;

the first BS transmitting a second RRC message on the first SRB to the communication device while the communication device is in the dual connectivity, wherein the second RRC message configures the communication device to release the SN; and the second BS keeping a data radio bearer (DRB) configuration, in response to the second RRC message, unless the second RRC message explicitly indicates to release the DRB configuration.

9. The network of claim 8, wherein the instructions further comprise:
the first BS keeping the first measurement configuration, in response to the second RRC message.

10. The network of claim 8, wherein the instructions further comprise:
the second BS releasing the second measurement configuration, in response to a second failure with the UE.

11. The network of claim 8, wherein the instructions further comprise:
the first BS keeping the first measurement configuration, in response to a second failure on the second SRB with the second BS.

12. The network of claim 8, wherein the instructions further comprise:
the second BS releasing a secondary cell group (SCG) configuration in response to releasing the SN, wherein the first RRC message comprises the SCG configuration generated by the second BS.

* * * * *